Nov. 26, 1957     F. W. ATKINS ET AL     2,814,454
AIRCRAFT DUCT SCREEN ARRANGEMENT
Filed April 25, 1955     3 Sheets-Sheet 1

Floyd W. Atkins &
Hugh W. Elkin
    INVENTORS

BY

ATTORNEY

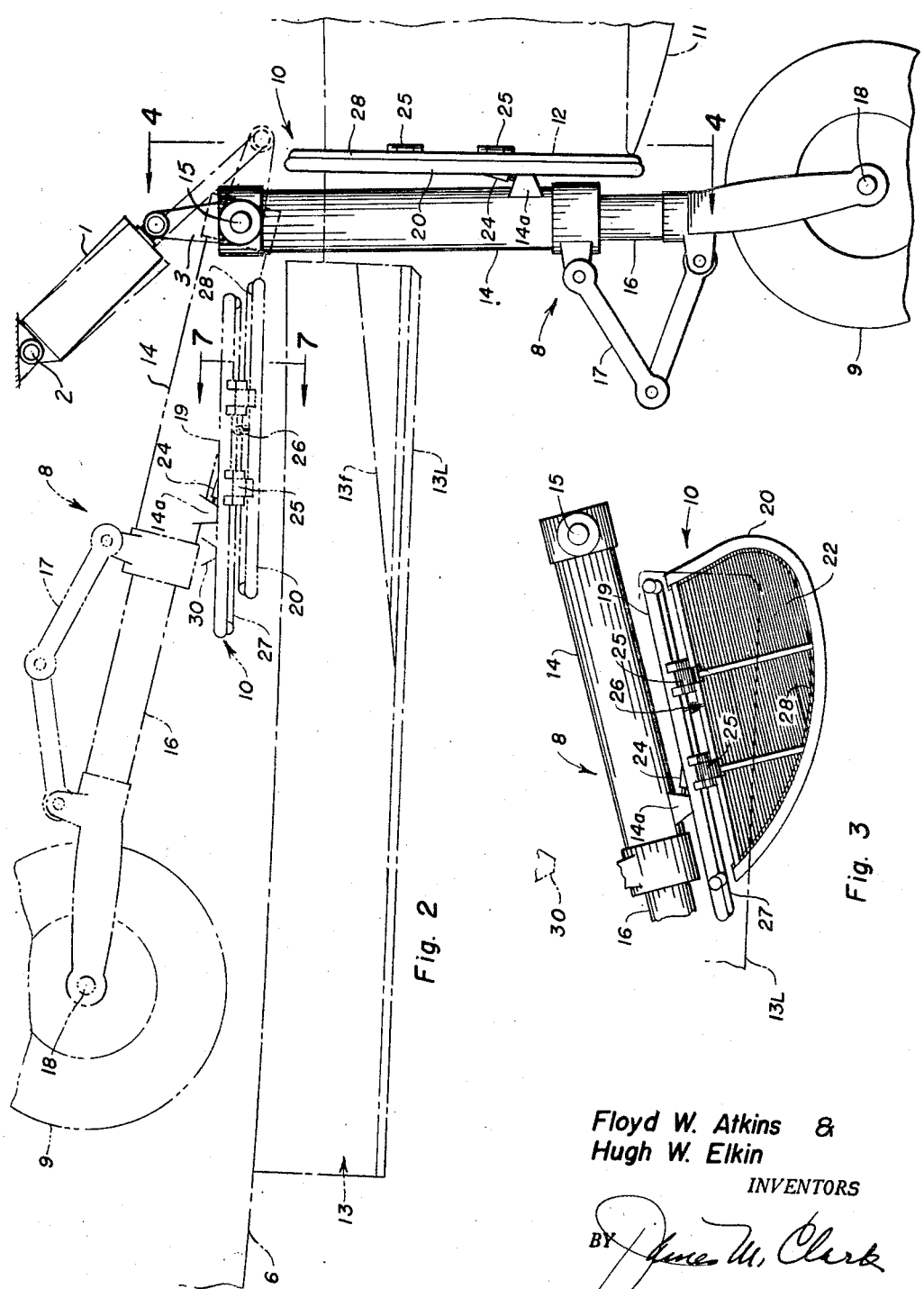

Nov. 26, 1957  F. W. ATKINS ET AL  2,814,454
AIRCRAFT DUCT SCREEN ARRANGEMENT
Filed April 25, 1955  3 Sheets-Sheet 3
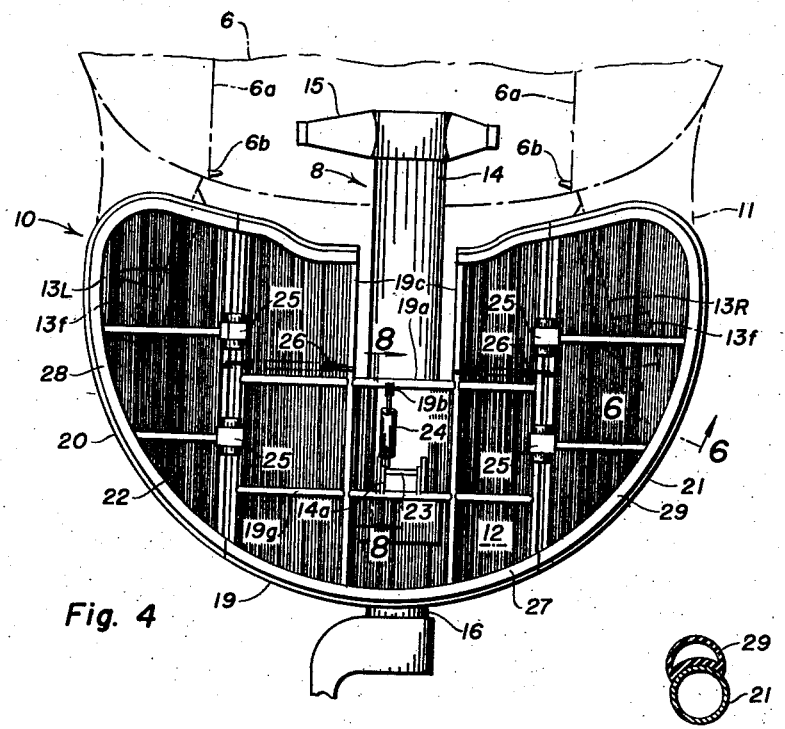
Fig. 4
Fig. 6
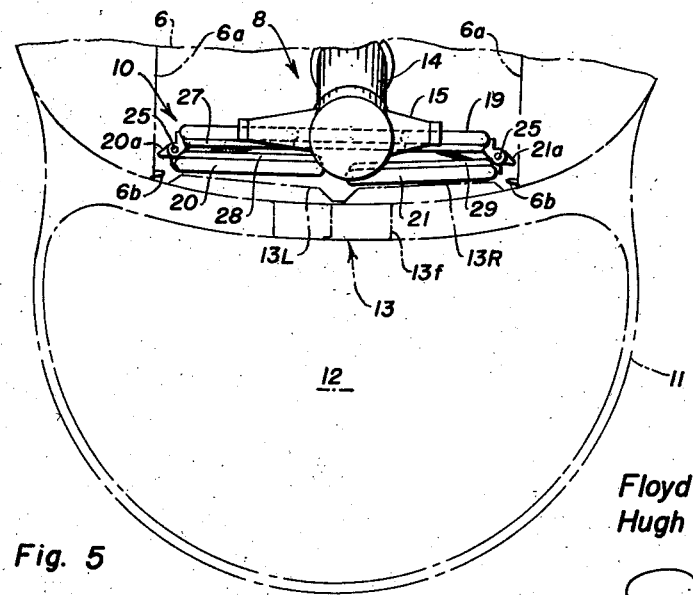
Fig. 5
Floyd W. Atkins &
Hugh W. Elkin
INVENTORS
BY
ATTORNEY.

United States Patent Office 2,814,454
Patented Nov. 26, 1957

2,814,454

AIRCRAFT DUCT SCREEN ARRANGEMENT

Floyd W. Atkins, San Pedro, and Hugh W. Elkin, Pasadena, Calif., assignors to North American Aviation, Inc.

Application April 25, 1955, Serial No. 503,457

10 Claims. (Cl. 244—102)

The present invention relates to jet propelled aircraft having retractable landing gears and more particularly to improvements in protective screen arrangements for the air intake ducts of the jet engines of such aircraft.

The operation of jet engines while the aircraft is on the ground has proven hazardous from several standpoints and certain of these hazards are due to the high rates of air flow entering the air intake ducts and presents the possibility that foreign bodies or even the clothing or limbs of attendants might be drawn into the ducts with resultant damage to both person and engine, or both. The high speeds of jet aircraft require that the landing gears be retractable in order to eliminate the resistance of the gear at the high flight speeds. In those jet propelled aircraft where the jet engine air intake is disposed either close to the ground, or immediately behind one of the landing wheels, the likelihood of stones and other objects being picked up and thrown into the intake are highly probable and have been the source of considerable damage and trouble.

These difficulties have been overcome and substantially eliminated by the improved arrangement provided by the present invention wherein a folding screen is mounted upon one of the retractable units of the landing gear, whereby, whenever the landing gear is extended the screen is automatically unfolded and moved into a position in which it protects the inlet to the air intake duct. The improved screen assembly is constructed in a plurality of spring-biased articulated units in such a manner that the side or lateral units cooperate with the fuselage structure at the wheel well for the landing gear unit whereby the screen is folded as the landing gear is retracted and the side units engage the jamb of the fairing door opening such that they are automatically closed and stored in the folded relationship. Similarly, as the landing gear unit is extended, the screen sections are pushed downwardly ahead of the landing gear, after its fairing doors have been opened, and as the screen components leave the well or opening in the fuselage the outer segments are again automatically rotated into their aligned positions into which they are assisted by the spring-biasing. The improvement also incorporates a novel resiliently-biased pivotal mounting of the central or main screen component upon the landing gear strut and the provision of a rubber seal between the screen and the lip or mouth of the air intake duct whereby the rubber seal is maintained in contact with the duct inlet in the operative position of the screen, and the improved mounting also permits the screen components to be moved relative to the strut as they both approach the retracted or inoperative position.

It is accordingly a major object of this invention to provide a screen for the air intake duct of a jet engine which is automatically placed in position when the landing gear of the aircraft is extended for landing or ground operation of the aircraft. A further object resides in the provision of an improved spring-biased articulated screen having a plurality of components which are automatically folded to a compact relationship for retraction and stowage within the aircraft, and which are automatically unfolded into the operative position to fully protect the mouth of the air intake. A still further object resides in an improved resilient pivotal mounting of the main component of the multiple screen assembly whereby the screen is adapted to bear with a degree of pressure against a seal member to effectively protect the mouth of the air intake duct.

Other objects and advantages of the present invention will become apparent to those skilled in the art following a reading of the present specification, taken in conjunction with the accompanying drawings, forming a part hereof, in which:

Fig. 2 is a similar view, to an enlarged scale, showing the screen assembly and the landing gear unit in both the extended and retracted positions;

Fig. 3 is a similar side elevational view showing the screen assembly partially folded as a result of contact with the fuselage well in an almost fully retracted position of the landing gear unit;

Fig. 4 is an elevational view of the screen assembly in its extended and unfolded operative position, looking forward, as taken along the lines 4—4 of Fig. 2;

Fig. 5 is a similar view, looking forward, but with the screen assembly folded in its fully retracted and stowed position;

Fig. 6 is a detail cross-sectional view of the frame of one of the outer screen components showing the attached seal means;

Figure 1:
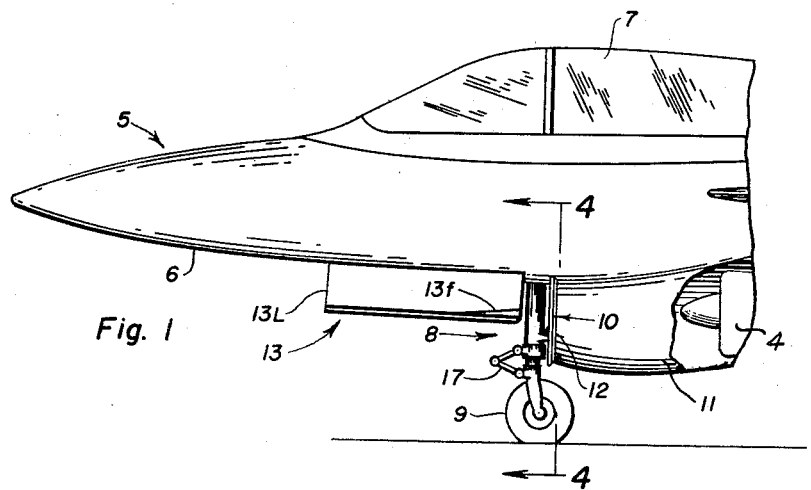
Fig. 1 is a side elevational view of the nose portion of an aircraft showing a preferred form of the improved screen assembly operatively associated with the nose wheel and the air intake duct of the aircraft.
Figure 7:
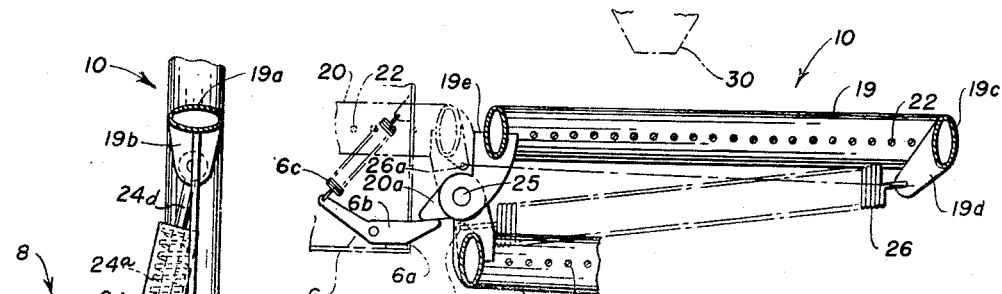
Figure 8:
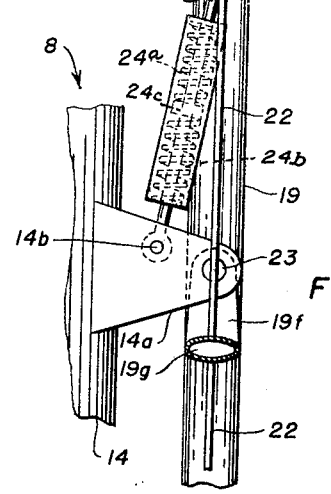

Fig. 7 is an enlarged elevational view, looking forward, showing the left portion of the screen assembly in an almost fully folded attitude of one of its outer panels with respect to the central component, this view also depicting a slightly extended position of the landing gear revealing the relationship of the screen assembly to the jamb of the opening of the fuselage after extension of the gear has been initiated for a very short distance, this view also showing in phantom the fully unfolded position of the same panel with respect to the central component after further extension of the gear; and Fig. 8 is an enlarged fragmentary view of the screen and the landing gear strut, looking in the direction of Fig. 1, and taken along the lines 8—8 in Fig. 4, showing the resiliently biased pivotal mounting of the screen upon the strut cylinder.

In Fig. 1 the numeral 5 indicates the nose or forward portion of a jet propelled aircraft having a fuselage 6 and a canopy 7 covering the control cockpit or compartment. The aircraft is supported upon the ground by a plurality of landing gear units, the nose wheel unit 8 of which is shown in this figure in its extended position supporting the aircraft upon the ground. The landing unit 8 has rotatably mounted thereon a customary nose wheel 9 and has pivotally attached to its main cylinder portion the improved screen assembly 10. The aircraft 5 is provided with a jet propelled power plant 4 of otherwise conventional nature which is supplied with air through the air intake duct 11, having a forwardly facing inlet opening or mouth 12. The nose wheel assembly 8 is retracted upwardly and forwardly by suitable well known retraction means, into a stowed position within the fuselage, the opening or well in which is covered and faired by the fairing door assembly 13, the left door 13L of which is shown in Fig. 1.

Reference to Fig. 2 shows that the nose wheel unit is comprised of the main upper cylinder portion 14 which is pivotally mounted upon the aircraft structure by means of the trunnion 15 about the axis of which it is rotated upwardly and forwardly into its retracted position as shown in the construction lines in this figure. Retraction of the nose wheel unit is effected by hydraulic cylinder 1 pivotally carried by the aircraft structure at 2 and connected by crank 3 to the wheel unit at trunnion 15. Extension of the cylinder unit rotates crank 3 and pivots the nose wheel unit to the retracted position. A conventional shock absorber is completed by the telescopic piston member 16 articulated to the cylinder element 14 by means of the nut-cracker or torque scissors assembly 17 which functions in a well known manner to permit relative telescoping of the piston 16 within the cylinder 14 while at the same time preventing relative rotation with respect thereto. The piston element 16 terminates in a yoke or axle fitting 18 from which the wheel 9 is rotatively carried.

As shown in Fig. 4 the screen assembly 10 is comprised of three articulated components, namely, the central or main component 19, which is pivotally supported from the landing gear cylinder 14, and the left and right lateral components 20 and 21, respectively. The support of the central unit 19 upon the cylinder of the landing gear is shown in detail in Fig. 8, wherein a rearwardly extending pair of lugs 14a are formed on the cylinder 14 from which the screen assembly 10 is supported by the pivot 23 and the lugs 19f which extend upwardly from the transverse screen element 19g. Each of the screen components is constructed of a metallic frame of elements of either circular or elliptic cross-section, such as shown in Figs. 6, 7 and 8, which are suitably apertured to receive and have fastened thereto the closely spaced stainless steel wires or rods 22 between which stones and other foreign objects are not permitted to pass. As shown in Fig. 8 as well as in the elevation in Fig. 4, a pair of closely spaced lugs 19b extend downwardly from the transverse screen element 19a to provide the upper pivotal support for the bungee spring unit 24, which is pivotally connected at its lower terminal by the pivot 14b to the bifurcated lugs 14a carried by the shock absorber cylinder 14. This bungee unit 24 is of conventional design including opposed centering springs 24a and 24b engaging disc 24c integral with shaft 24d. Thus the bungee serves to keep the screen assembly 10 in a biased position to maintain the seal 29 in pressure contact with the forward lip 12 of the duct 11 especially during taxiing operations, which might otherwise result in fore and aft deflections of the landing gear strut against or away from the entrance to the air intake duct. The seals 27, 28 and 29 have been omitted for clarity in Figs. 7 and 8. The bungee spring unit 24 also permits relative pivotation of the screen assembly 10 in its retracted position with respect to the movement of the cylinder member 14 as shown in Fig. 2, in which the assembly 10 has engaged the fixed stop 30 on the fuselage and the landing gear unit has been retracted to a somewhat further extent upwardly about the trunnion 15. Doors 13R and 13L have meeting fairing portions 13f.

As shown in Fig. 4, the lateral screen components 20 and 21 are pivotally mounted upon the central unit 19 by means of the hinges 25, and are spring-biased by means of the springs 26 into either the full open or unfolded condition shown in Fig. 4, or into the folded condition shown in Fig. 5. The springs 26 are arranged to provide an over-center action, as shown in Fig. 7, whereby the automatic folding and unfolding upon retraction and extension of the screen assembly is accomplished. As shown in Fig. 7, the hinges 25 are offset to the rear of the main plane of the screen assembly 10 in its vertical operative position, or offset beneath the plane of the central unit 19 in the partially retracted position shown in Fig. 7. Each hinge is supported from the central component 19 by the hinge bracket 19e, and the outer panels, such as 20 in Fig. 7, are connected to the hinge pin 25 by a similar hinge bracket attached to the unit 20, which bracket or lug has an extending tongue portion 20a engageable with a pivoted detent 6b biased by the spring 6c adjacent the opening 6a in the bottom of the fuselage 6.

The tension spring 26 is supported from the vertical frame element 19c at the lug 19d, and at its outer extremity is attached to the lug portion 20a by the spring terminal connection 26a. The components in Fig. 7 are shown in the position in which the screen has just started to be extended with the landing gear, and the extending tongue 20a, being fixed to the panel 20, has just engaged the extending detent 6b adjacent the jamb or edge of the opening 6a. As the screen assembly 10 continues its downward movement with the extending landing gear unit 8, the detent 6b prevents downward movement of the tongue 20a and imparts clockwise rotation thereto about the axis of the hinge 25, causing the outer component 20 of the screen to be similarly rotated in the clockwise direction to the point at which the spring connection 26a extends beyond the line of the dead-center interconnecting the opposite spring terminal at the lug 19d with the axis of the pivot 25. Beyond this dead-center the spring 26 causes the outer panel to assume its extended and aligned position as shown in the construction lines in Fig. 7. The construction of the opposite wing 21 of the screen is the same, having a similar tongue 21a as shown in Fig. 5, and is unfolded at the same time. Similarly, upon retraction of the landing gear unit and its attached screen assembly 10, the outer component 20 initially strikes the edge of the door 13L and subsequently the jamb at the opening 6a which imparts counterclockwise rotation to the component 20 about the hinge 25 beyond the dead-center at which the spring 26 draws the outer component 20 upwardly and inwardly into the folded position shown in full lines in Fig. 7, substantially parallel but beneath the central component 19. The final folding force is applied when the hinges 25 at the inner end of the panel 20 engage the bottom of the fuselage adjacent the opening 6a. In this position the tongue 20a extends outwardly, and after deflecting the detent 6b, is permitted to be retracted further upwardly into the landing gear well in which the central component 19 is limited in its retractive movement by engagement with the fixed stop 30 carried upon the fuselage structure. The screen sections are limited in their unfolding movement by the abutment portions on the hinge lugs 19e and 20a which maintain the sections 19 and 20, (as well as 21) in their aligned positions with the aid of the springs 26.

As shown in Figs. 2 to 6, inclusive, a tubular rubber seal element is fastened to the peripheral frame members of the components 19, 20 and 21 of the screen assembly 10. The seal member is shown in detail in Fig. 6 in which the seal 29 is attached to the outer peripheral member of the component 21, a like seal member 27 being similarly attached to the peripheral members of the center unit 19, and a like seal member 28 is attached to the corresponding frame portion of the opposite lateral component 20. These seal members provide sufficient resilience such that under the influence of the bungee spring 24, which serves to cause the extended screen assembly 10 to be rotated about its pivotal mounting 23, they bear in a pressure relationship against the lip 12 of the air intake duct 11 to the jet engine. These seal units are continuous around the periphery except for interruptions at the hinge lines at which they are cut-away to permit folding of the elements into the compact retracted condition shown.

The present invention is not limited to screen arrangements for single engine or single duct installations. It also contemplates its use with multiple or twin ducts which may be disposed behind the landing gear, but not nesessarily in-line, in which case the screen sections may either be carried by the landing gear or directly associated therewith. Rearwardly positioned ducts may lie aft of the main landing gear and be similarly associated, the screens retracting fore and aft, or arranged to be displaced sideways to accomplish a similar result.

Other forms and modifications of the present invention, both with respect to its general arrangement and the details of its respective parts, are intended to come within the scope and spirit of this invention, as more particularly set forth in the appended claims.

We claim:

1. In an aircraft, a power plant having an air intake duct, said duct having a forwardly directed opening, a retractable landing gear operatively supported on the aircraft forward of said air intake duct, a landing gear well formed within the aircraft, means on said aircraft for retracting said landing gear into said well within the aircraft, a foldable screen having a transverse portion of a size and area to cover said duct opening, said screen operatively carried by said landing gear for movement therewith from a stowed position within said well to an operative position in which it screens the air entering said intake duct and hinge means operatively carried by said screen engageable upon retraction with the aircraft in the region of said well for automatically folding said screen to facilitate stowage within said well.

2. In an aircraft, a power plant having an air intake duct, a retractable landing gear operatively supported on the aircraft forward of said air intake duct, a landing gear well formed within the aircraft, means for retracting said landing gear into said well within the aircraft, a foldable screen operatively carried by said landing gear having movement therewith from a stowed position from within said well to an operative unfolded position in which it has a transverse shape and area which screens the air entering said intake duct, said screen in its unfolded position being too wide to be stowed within said well, and spring-biased hinge means operatively carried by said screen engageable with the aircraft upon retraction for automatically folding said screen to facilitate stowage within said well.

3. In an aircraft, a power plant having an air intake duct, a retractable landing gear operatively supported on the aircraft forward of said air intake duct, a landing gear well formed within the aircraft, means for retracting said landing gear into said well within the aircraft, a foldable screen comprising a plurality of screen sections operatively carried by said landing gear for movement therewith from a stowed position from within said well to an operative unfolded position in which it has a transverse shape and area which screens the air entering said intake duct, said screen in its unfolded position being too wide to be stowed within said well, and spring-biased hinge means operatively carried by said screen sections engageable with the aircraft upon retraction for automatically folding said screen to facilitate stowage within said well.

4. In an aircraft, a power plant having an air intake duct, a retractable landing gear operatively supported on the aircraft forward of said air intake duct, a landing gear well formed within the aircraft, means for retracting said landing gear into said well within the aircraft, a foldable screen comprising a plurality of screen sections operatively carried by said landing gear for movement therewith from a stowed position from within said well to an operative unfolded position in which it has a transverse shape and area which screens the air entering said intake duct, said screen in its operative unfolded position being too wide to be stowed within said well, seal means carried upon said screen sections adapted to sealingly bear against said air intake duct in the extended position of said landing gear and said screen, and spring-biased hinge means operatively carried by said screen sections engageable with the aircraft adjacent said landing gear well upon retraction for automatically folding said screen to facilitate stowage within said well.

5. In a jet propelled aircraft having a power plant, an air intake duct for said power plant having forwardly facing inlet opening means, a retractable landing gear operatively supported from the aircraft immediately forward of said air intake duct inlet opening means, the improvement comprising a screen member pivotally mounted upon said landing gear and resilient means interconnecting said screen member and said landing gear tending to urge said screen about said pivotal mounting with respect to said landing gear against said inlet opening means when said landing gear is extended into an operative position whereby said screen is resiliently held against said air intake duct inlet opening means.

6. In a jet propelled aircraft having a power plant, an air intake duct for said power plant having a forwardly facing inlet opening, a retractable landing gear operatively supported from the aircraft immediately forward of said air intake duct inlet opening, the improvement comprising a screen member, seal means carried by said screen and resilient means including a bungee spring and a pivot interconnecting said screen member and said landing gear tending to urge said screen about said pivotal mounting with respect to said landing gear against the inlet opening of said air intake duct when said landing gear is extended into an operative position whereby said seal means of said screen is resiliently held against the inlet opening of said air intake duct.

7. In an aircraft having a fuselage, said fuselage having a forwardly directed air intake duct formed therein, a retractable landing gear operatively carried upon said fuselage forward of said air intake duct and movable between retracted and extended positions, and a screen mounted upon said landing gear for movement therewith arranged in said extended position of said landing gear to extend in front of and protect said air intake duct from rearwardly moving particles thrown up by said landing gear.

8. In an aircraft having a fuselage, said fuselage having a forwardly directed air intake duct formed therein, a retractable landing gear operatively carried upon said fuselage forward of said air intake duct and movable between retracted and extended positions, and a screen mounted upon said landing gear for movement therewith, said screen having a transverse area sufficient to cover the forwardly directed opening of said air intake duct arranged in said extended position of said landing gear to extend in front of and protect said air intake duct from rearwardly moving particles thrown up by said landing gear.

9. In an aircraft, a power plant having an air intake duct, said duct having a forwardly directed opening, a retractable landing gear operatively supported on the aircraft forward of said air intake duct, a landing gear well formed within the aircraft, means on said aircraft for retracting said landing gear into said well within the aircraft, and a screen having a transverse portion of a size and area to cover said duct opening, said screen operatively carried by said landing gear for movement therewith from a retracted position within said well to an operative extended position in which it screens the air entering said intake duct.

10. In an aircraft, a power plant having an air intake duct, a retractable landing gear operatively supported on the aircraft forward of said air intake duct, a landing gear well formed within the aircraft, means on said aircraft for retracting said landing gear into said well within the aircraft, a foldable screen comprising a plurality of screen sections operatively carried by said landing gear for movement therewith from a stowed position from within said well to an extended operative position in which it has a transverse shape and area which screens the air entering said intake duct, said screen in its operative position and unfolded condition being too wide to be stowed within said well, seal means carried upon said screen sections adapted to sealingly bear against said air intake duct in the operative position of said screen, and spring-biased hinge means interconnecting certain of said screen sections, said hinge means having an over-center relationship with respect to the plane of said screen sections, and tongue elements operatively carried by said screen sections engageable with the aircraft adjacent said landing gear well upon retraction of said landing gear and said screen for automatically folding said screen sections about said hinge means to facilitate stowage within said well, said tongue elements engageable with the aircraft adjacent said landing gear well upon extension of said landing gear and said screen for automatically unfolding said screen sections to said operative position.

References Cited in the file of this patent

UNITED STATES PATENTS

| | | |
|---|---|---|
| 2,604,278 | Johnson | July 22, 1952 |
| 2,695,074 | Kelly | Nov. 23, 1954 |

FOREIGN PATENTS

| | | |
|---|---|---|
| 498,879 | Canada | Dec. 29, 1953 |